(12) United States Patent
Huang et al.

(10) Patent No.: US 8,694,885 B2
(45) Date of Patent: Apr. 8, 2014

(54) KEYBOARD INPUT METHOD AND ASSISTANT SYSTEM THEREOF

(75) Inventors: Jui-Tsen Huang, Taipei (TW); Pei-Yuan Lo, Taipei (TW)

(73) Assignee: Compal Electronics, Inc., Taipei (TW)

( * ) Notice: Subject to any disclaimer, the term of this patent is extended or adjusted under 35 U.S.C. 154(b) by 512 days.

(21) Appl. No.: 12/603,583

(22) Filed: Oct. 21, 2009

(65) Prior Publication Data

US 2011/0055639 A1 Mar. 3, 2011

(30) Foreign Application Priority Data

Aug. 28, 2009 (TW) .............................. 98129129 A (51) Int. Cl.
*G06F 3/00* (2006.01)

(52) U.S. Cl.
USPC ........... 715/705; 715/708; 715/710; 715/816; 715/968

(58) Field of Classification Search
None
See application file for complete search history.

(56) References Cited

U.S. PATENT DOCUMENTS

| | | | |
|---|---|---|---|
| 5,388,251 A * | 2/1995 | Makino et al. .................. | 714/57 |
| 2004/0155869 A1 | 8/2004 | Robinson et al. | |
| 2006/0176283 A1* | 8/2006 | Suraqui ......................... | 345/169 |
| 2007/0074131 A1* | 3/2007 | Assadollahi .................. | 715/816 |
| 2007/0216640 A1* | 9/2007 | Chen .............................. | 345/156 |
| 2009/0265669 A1* | 10/2009 | Kida et al. .................... | 715/863 |
| 2010/0156807 A1* | 6/2010 | Stallings et al. .............. | 345/173 |

OTHER PUBLICATIONS

"Office Action of Taiwan Counterpart Application", issued on Feb. 26, 2013, p. 1-p. 12.

* cited by examiner

*Primary Examiner* — Steven Sax
*Assistant Examiner* — Anil N Kumar
(74) *Attorney, Agent, or Firm* — Jianq Chyun IP Office (57) ABSTRACT

A keyboard input method and an assistant system thereof are provided. In the present method, first, an assistant on-screen keyboard program is launched and an input signal is received. Then, if it is determined that the input signal represents an input character, whether the input character leads to an input error is determined according to an input method of an electronic device. If the input character leads to the input error, a keyboard position of the key corresponding to the input character is obtained, and a partial area of an assistant on-screen keyboard is displayed according to the position, wherein the partial area includes the key corresponding to the input character.

13 Claims, 6 Drawing Sheets

KEYBOARD INPUT METHOD AND ASSISTANT SYSTEM THEREOF

CROSS-REFERENCE TO RELATED APPLICATION

This application claims the priority benefit of Taiwan application serial no. 98129129, filed on Aug. 28, 2009. The entirety of the above-mentioned patent application is hereby incorporated by reference herein and made a part of specification.

BACKGROUND OF THE INVENTION

1. Field of the Invention

The present invention generally relates to an input assistant method of an electronic device, and more particularly, to a method of automatically and timely displaying an assistant on-screen keyboard when a user inputs and related applications thereof.

2. Description of Related Art

Keyboards and mice are the input devices that are most commonly used by users of computer systems. A user can input text or symbols through a keyboard or click, open, or execute files and application programs stored in a computer through a mouse. Besides this kind of physical input devices, an on-screen keyboard directly displayed on a screen is another tool that can display the character corresponding to each key and replace the physical keyboard for inputting text and symbols.

In an existing computer system, the screen does not automatically display an on-screen keyboard when a user inputs. Namely, when the user needs to use the on-screen keyboard, the user has to manually launch an on-screen keyboard function to see the operation image of the on-screen keyboard at the bottom right corner of the screen. A complete on-screen keyboard is displayed on the screen after the on-screen keyboard function is launched. However, because there are many keys on the keyboard and each key may represent more than one input characters, the user needs to find the desired keys on the entire on-screen keyboard. Obviously, the user's input efficiency is very low by using an existing on-screen keyboard.

SUMMARY OF THE INVENTION

Accordingly, the present invention is directed to a keyboard input method which allows a user to input conveniently.

The present invention is directed to a keyboard input assistant system which allows a user to perform different settings regarding the display pattern of an assistant on-screen keyboard according to the user's habits.

The present invention provides a keyboard input method suitable for an electronic device having a screen. First, an assistant on-screen keyboard program is launched and an input signal is received. If it is determined that the input signal represents an input character, whether the input character leads to an input error is determined according to an input method of the electronic device. If the input character leads to the input error, the keyboard position of a key corresponding to the input character is obtained, and a partial area of an assistant on-screen keyboard is displayed according to the position, wherein the partial area includes the key. If the input character does not lead to the input error, the assistant on-screen keyboard is not displayed.

According to an embodiment of the present invention, the step of determining whether the input character leads to the input error according to the input method of the electronic device includes following steps. First, a database corresponding to the input method is obtained, wherein the database contains a plurality of words. Then, whether the input character and at least one previous input character form any one of the words is determined. It is determined that the input character does not lead to the input error if the input character and the previous input character form one of the words, and it is determined that the input character leads to the input error if the input character and the previous input character do not form any one of the words.

According to an embodiment of the present invention, the assistant on-screen keyboard is divided into a left keyboard and a right keyboard. After the step of obtaining the position of a key corresponding to the input character, the keyboard input method further includes determining whether the position is located in the left keyboard or the right keyboard. If the position is located in the left keyboard, the left side of the screen is served as a first side, the right side of the screen is served as a second side, and a plurality of predetermined keys corresponding to the right keyboard is obtained and served as an assistant partial area. If the position is located in the right keyboard, the right side of the screen is served as the first side, the left side of the screen is served as the second side, and the predetermined keys corresponding to the left keyboard are obtained and served as the assistant partial area.

According to an embodiment of the present invention, the step of displaying the partial area of the assistant on-screen keyboard according to the position includes displaying the partial area of the assistant on-screen keyboard at the first side of the screen and displaying the assistant partial area of the assistant on-screen keyboard at the second side of the screen.

According to an embodiment of the present invention, the step of displaying the assistant partial area of the assistant on-screen keyboard at the second side of the screen includes displaying the assistant partial area close to the second side.

According to an embodiment of the present invention, the step of displaying the partial area of the assistant on-screen keyboard at the first side of the screen includes following steps. A plurality of adjoining keys around the key is obtained from the left keyboard or the right keyboard according to the position. The key and the adjoining keys are served as the partial area, and the partial area is displayed close to the first side. When the partial area is displayed, the key corresponding to the input character is marked with a specific mark (for example, a frame).

According to an embodiment of the present invention, after the step of displaying the partial area at the first side and the assistant partial area at the second side according to the position, the keyboard input method further includes controlling the screen to stop displaying the partial area and the assistant partial area of the assistant on-screen keyboard when the input signal is received again.

According to an embodiment of the present invention, after the step of displaying the partial area of the assistant on-screen keyboard according to the position, the keyboard input method further includes controlling the screen to stop displaying the partial area of the assistant on-screen keyboard when the input signal is received again.

According to an embodiment of the present invention, the input signal is from a physical keyboard or a software input panel (SIP) of the electronic device.

The present invention also provides a keyboard input method suitable for an electronic device having a screen and an assistant on-screen keyboard. First, an assistant on-screen keyboard program is launched to receive an enabling input signal. Then, a first partial area and a second partial area of the assistant on-screen keyboard are respectively displayed at a first side and a second side of the screen according to the enabling input signal.

According to an embodiment of the present invention, besides being used for turning on or off the assistant on-screen keyboard, a specific key is further used for turning on or off an error-detecting function of the assistant on-screen keyboard or for switching the assistant on-screen keyboard to an error-detecting mode or an assistant input mode.

According to an embodiment of the present invention, the first side is the left side of the screen, and the second side is the right side of the screen.

According to an embodiment of the present invention, after the step of respectively displaying the first partial area and the second partial area of the assistant on-screen keyboard at the first side and the second side of the screen, the keyboard input method further includes, when an input signal representing an input character is received, obtaining a plurality of adjoining keys around a key corresponding to the input character on the assistant on-screen keyboard and displaying the key and the adjoining keys on the screen.

According to an embodiment of the present invention, the first partial area includes a plurality of predetermined keys located within a left keyboard of the assistant on-screen keyboard, and the second partial area includes a plurality of predetermined keys located within a right keyboard of the assistant on-screen keyboard.

According to an embodiment of the present invention, the enabling input signal is triggered by a specific key, and the specific key is a physical key or a software key of the electronic device.

The present invention further provides a keyboard input assistant system including a keyboard display decision-making module, an input method error-detecting module, and a processing module. The keyboard display decision-making module determines whether an input signal issued by an input module of an electronic device represents an input character when the input signal is received. The input method error-detecting module is coupled to the keyboard display decision-making module, and which determines whether the input character leads to an input error according to an input method of the electronic device when the keyboard display decision-making module determines that the input signal represents the input character. The processing module is coupled to the keyboard display decision-making module and the input method error-detecting module, and which notifies the keyboard display decision-making module to obtain the keyboard position of a key corresponding to the input character when an assistant on-screen keyboard program is launched and the input character leads to the input error. The keyboard display decision-making module displays a partial area of the assistant on-screen keyboard on the screen of the electronic device according to the position, wherein the partial area includes the key.

As described above, in the present invention, when an input error produced by a user is detected, two partial areas of an assistant on-screen keyboard are automatically displayed at both sides of a screen, wherein the key causing the input error is especially marked so that the user can instantly find it and make a correction. Thereby, the input efficiency is improved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
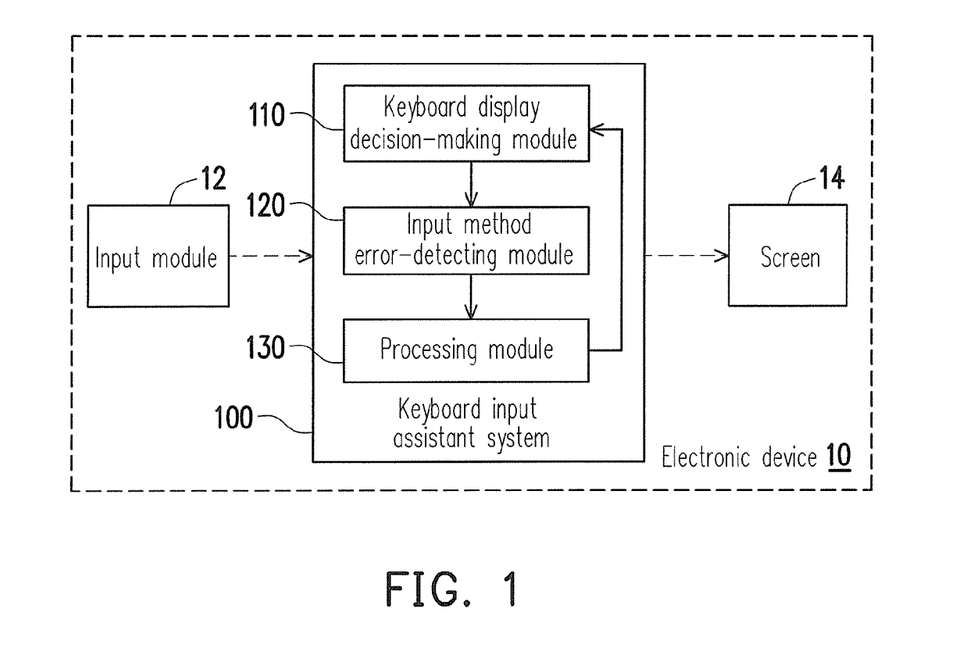
FIG. 1 is a block diagram of an electronic device and a keyboard input assistant system according to an embodiment of the present invention.

FIG. 1 is a block diagram of an electronic device and a keyboard input assistant system according to an embodiment of the present invention. In the present embodiment, the keyboard input assistant system 100 is disposed in an electronic device 10 having an input module 12 and a screen 14. The electronic device 10 may be a desktop computer, a notebook computer, a personal digital assistant (PDA), or a PDA phone. However, the type of the electronic device 10 is not limited herein. The input module 12 may be a physical keyboard or a software input panel (SIP). Similarly, the type of the input module 12 is not limited herein.

In the present embodiment, the keyboard input assistant system 100 includes a keyboard display decision-making module 110, an input method error-detecting module 120, and a processing module 130. Through the operations of these modules, after an input signal triggered by a user's operation through the input module 12 is received, the keyboard input assistant system 100 directly displays two predetermined partial areas of an assistant on-screen keyboard respectively at each side of the screen 14 according to the type of the input signal. Or, when the input signal leads to an input error, the keyboard input assistant system 100 displays a partial area of the assistant on-screen keyboard including the key causing the input error on the screen 14.

Figure 2A:
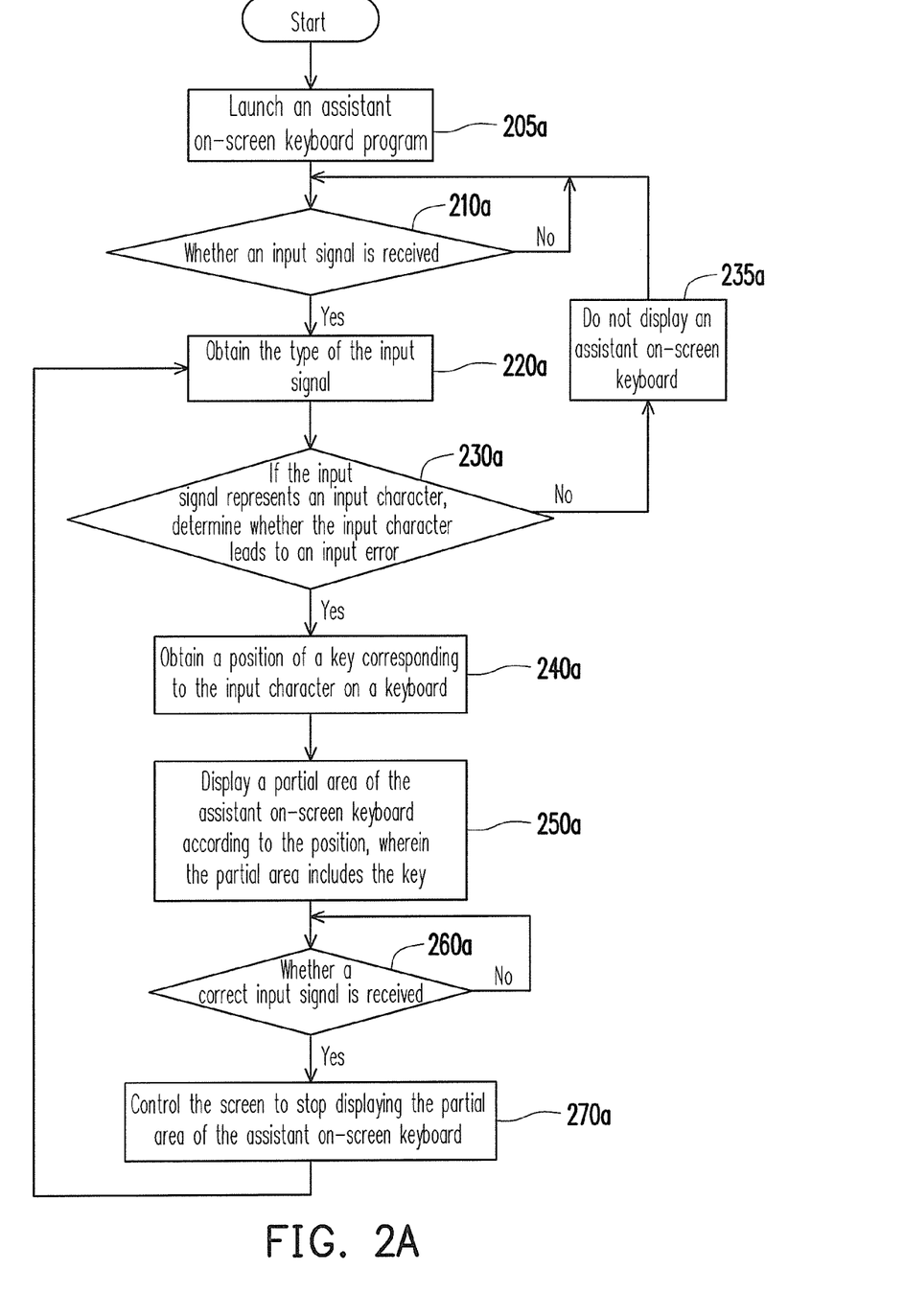
FIG. 2A is a flowchart of a keyboard input method according to an embodiment of the present invention.

Below, the operation of the keyboard input assistant system 100 will be described in detail with reference to another embodiment of the present invention. FIG. 2A is a flowchart of a keyboard input method according to an embodiment of the present invention. Referring to both FIG. 1 and FIG. 2A, first, in step 205a, an assistant on-screen keyboard program is launched after the electronic device 10 is powered on. Then, in step 210a, the keyboard display decision-making module 110 constantly determines whether the input signal issued by the input module 12 is received. Once the user starts to operate the electronic device 10 through the input module 12, the input signal triggered by the user's operation through the input module 12 is then transmitted to the keyboard display decision-making module 110 of the keyboard input assistant system 100 through an embedded controller (EC) and a central processing unit (CPU) of the electronic device 10.

After the input signal is received, in step 220a, the keyboard display decision-making module 110 obtains the type of the input signal. Next, in step 230a, if the input signal represents an input character, the input method error-detecting module 120 determines whether the input character leads to an input error according to a current input method of the electronic device 10. To be specific, the input method error-detecting module 120 first obtains a database corresponding to the input method, wherein the database contains a plurality of words. Next, the input method error-detecting module 120 determines whether the input character and at least one previous input character can form any word in the database. If the input character and the previous input character can form a word in the database, the input method error-detecting module 120 determines that the input character does not lead to the input error. In this case, as in step 235a, the assistant on-screen keyboard is not displayed on the screen 14, and the text (or symbol) input by the user is displayed on the screen 14 according to a general input procedure. After that, the keyboard input method returns to step 210 again to wait for the next input operation of the user.

However, if the input character and the previous input character cannot form any word in the database, the input method error-detecting module 120 determines that the input character leads to the input error. In this case, as in step 240a, after obtaining the determination result of the input method error-detecting module 120, the processing module 130 notifies the keyboard display decision-making module 110 to obtain keyboard the position of the key corresponding to the input character.

After that, in step 250a, the keyboard display decision-making module 110 displays a partial area of the assistant on-screen keyboard on the screen 14 according to the position of the key, wherein the partial area includes the key.

Thereafter, in step 260a, the keyboard display decision-making module 110 determines whether a correct input signal is received. If the correct input signal is received, in step 270a, the keyboard display decision-making module 110 controls the screen 14 to stop displaying the partial area of the assistant on-screen keyboard. Next, the keyboard input method returns to step 220a to determine the type of the new input signal. If it is determined that the input signal represents an input character, the step of displaying the partial area of the assistant on-screen keyboard on the screen 14 according to the position of the corresponding key if an input error occurs is repeated.

Figure 2B:
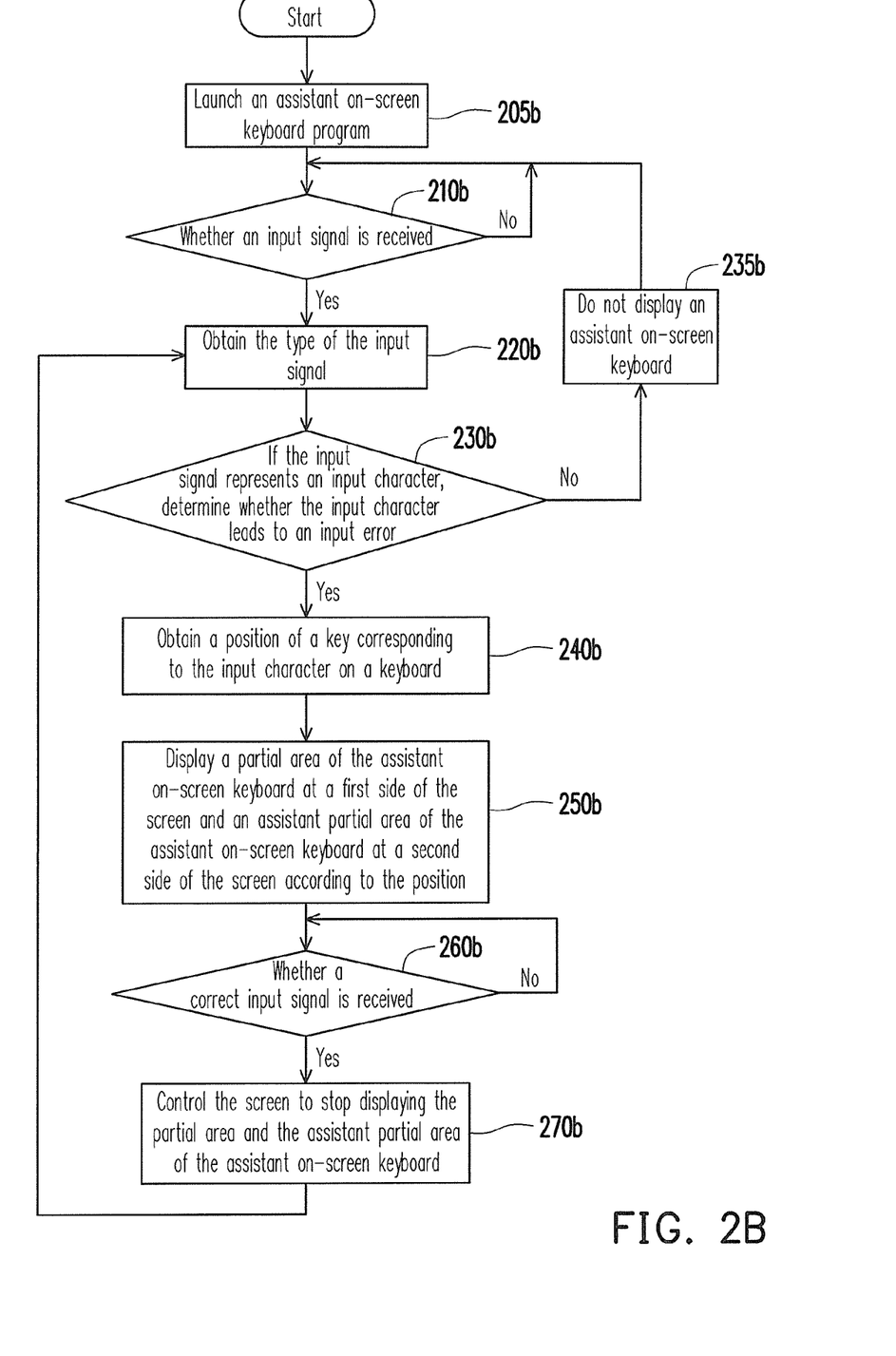
FIG. 2B is a flowchart of a keyboard input method according to another embodiment of the present invention.

FIG. 2B is a flowchart of a keyboard input method according to another embodiment of the present invention. The steps 205b~240b in FIG. 2B are the same as or similar to the steps 205a~240a in FIG. 2A therefore will not be described herein.

If the input character leads to the input error, after the position of the key corresponding to the input character is obtained, in step 250b, the keyboard display decision-making module 110 displays the partial area (the partial area includes the key corresponding to the input character) of the assistant on-screen keyboard at a first side of the screen 14 according to the position of the key and displays an assistant partial area of the assistant on-screen keyboard at a second side of the screen 14.

In the present embodiment, the assistant on-screen keyboard is divided into a left keyboard and a right keyboard. Thus, when an input error occurs, the keyboard display decision-making module 110 first determines whether the key corresponding to the input character is located within the left keyboard or the right keyboard. Assuming that the key corresponding to the input character is located within the left keyboard, the keyboard display decision-making module 110 serves the left side of the screen 14 as the first side and the right side of the screen 14 as the second side. Besides, the keyboard display decision-making module 110 obtains a plurality of adjoining keys around the key corresponding to the input character in the left keyboard and serves the key and the adjoining keys as the partial area. The keyboard display decision-making module 110 further obtains a plurality of predetermined keys corresponding to the right keyboard as the assistant partial area. In the present embodiment, the predetermined keys corresponding to the right keyboard may be determined by the user. However, the scope thereof is not limited in present invention. Next, the keyboard display decision-making module 110 displays the partial area close to the first side (i.e., the left side) and marks the key corresponding to the input character with a specific mark. Meanwhile, the keyboard display decision-making module 110 displays the assistant partial area close to the second side (i.e., the right side).

Similarly, if the keyboard display decision-making module 110 determines that the key corresponding to the input character is located within the right keyboard, the keyboard display decision-making module 110 serves the right side of the screen 14 as the first side and the left side of the screen 14 as the second side. The keyboard display decision-making module 110 obtains the adjoining keys around the key corresponding to the input character in the right keyboard and serves the key and the adjoining keys as the partial area. Meanwhile, the keyboard display decision-making module 110 further obtains a plurality of predetermined keys corresponding to the left keyboard as the assistant partial area. Next, the keyboard display decision-making module 110 displays the partial area close to the first side (i.e., the right side) of the screen 14 and marks the key corresponding to the input character with a specific mark. Meanwhile, the keyboard display decision-making module 110 displays the assistant partial area close to the second side (i.e., the left side).

Next, in step 260b, the keyboard display decision-making module 110 determines whether a correct input signal is received. If the correct input signal is received, in step 270b, the keyboard display decision-making module 110 controls the screen 14 to stop displaying the partial area and the assistant partial area of the assistant on-screen keyboard. The keyboard input method then returns to step 220b to wait for the next input of the user, and the step of respectively displaying the partial areas of the assistant on-screen keyboard at both sides of the screen 14 according to the position of the corresponding key when an input error occurs is repeated.

As shown in FIG. 2B, when the user input text (or symbols) through the input module 12, once the keyboard input assistant system 100 detects any wrong character typed by the user, the keyboard input assistant system 100 automatically displays two partial areas of the assistant on-screen keyboard respectively at both sides of the screen 14, wherein the key causing the input error is especially marked with a specific mark, and one or more predetermined keys may be displayed at the other side. However, it should be noted that the type of the input method and the input language are not limited in the present invention, and the input language could be English, Chinese, Japanese, or any other languages.

Figure 3:
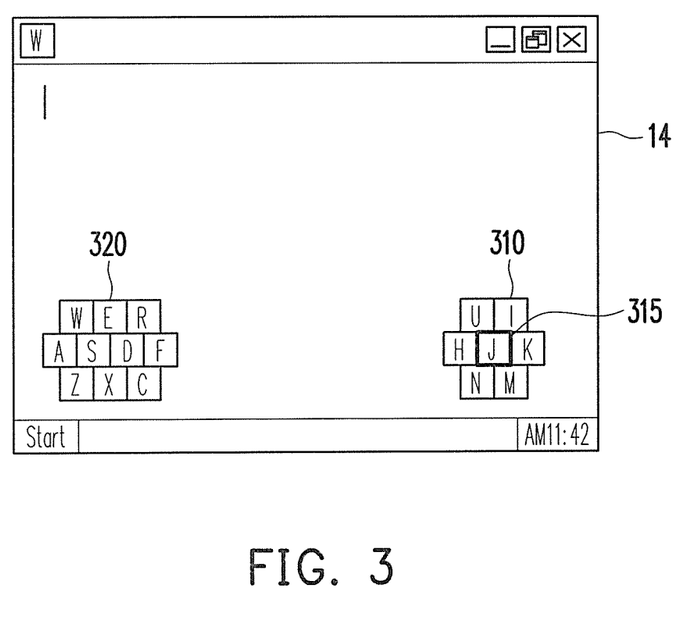
FIG. 3 is a diagram of an assistant on-screen keyboard according to an embodiment of the present invention.

FIG. 3 is a diagram of an assistant on-screen keyboard according to an embodiment of the present invention. For the convenience of description, it is assumed that an input error is caused when the user inputs the English character J. Because the English character J is located within the right keyboard of the assistant on-screen keyboard, the keyboard display decision-making module 110 serves the right side of the screen 14 as the first side, defines the key corresponding to the English character J and the adjoining keys (i.e., the keys corresponding to the English characters H, K, U, I, N, and M) around the English character J on the right keyboard of the assistant on-screen keyboard as a partial area 310, and displays the partial area 310 close to the right side of the screen 14.

Besides, the keyboard display decision-making module 110 also defines the predetermined keys (in the present embodiment, the predetermined keys may be the keys corresponding to the English characters W, E, R, A, S, D, F, Z, X, and C) corresponding to the left keyboard of the assistant on-screen keyboard as an assistant partial area 320 and displays the assistant partial area 320 close to the left side of the screen 14. The keyboard display decision-making module 110 marks the English character J causing the input error with a specific mark (for example, a frame 315), so that the user can instantly locate the key causing the input error and find the desired key among the adjoining keys.

Figure 4A:
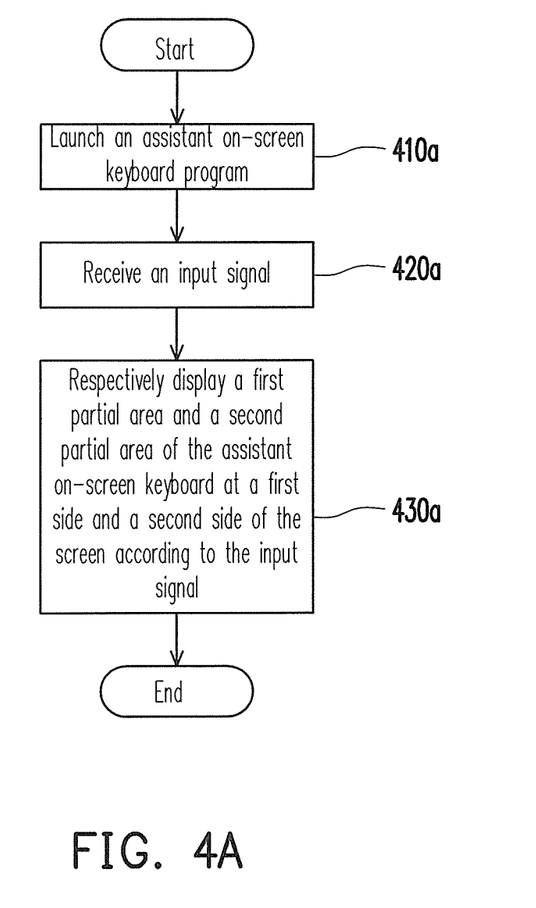
FIG. 4A is a flowchart of a keyboard input method according to yet another embodiment of the present invention.

FIG. 4A is a flowchart of a keyboard input method according to yet another embodiment of the present invention. Referring to both FIG. 1 and FIG. 4A, first, in step 410*a*, the assistant on-screen keyboard program of the electronic device 100 is already launched. Then, in step 420*a*, an enabling input signal (referred to as an input signal thereinafter) is received. In the present embodiment, the input signal is triggered by a specific key (for example, a hot key or a function key, etc), wherein the specific key may be a physical key or a software key of the electronic device 100. However, the type of the specific key is not limited herein. The user uses the specific key to launch and switch the assistant on-screen keyboard function of the electronic device 100.

Finally, in step 430*a*, the keyboard display decision-making module 110 respectively displays a first partial area of the assistant on-screen keyboard at a first side (for example, the left side) of the screen 14 and a second partial area of the assistant on-screen keyboard at a second side (for example, the right side) of the screen 14 according to the input signal. For example, the first partial area displayed at the first side includes a plurality of predetermined keys located within the left keyboard of the assistant on-screen keyboard, and the second partial area displayed at the second side includes a plurality of predetermined keys located within the right keyboard of the assistant on-screen keyboard.

Thereafter, when an input signal representing an input character is received, a plurality of adjoining keys around the key corresponding to the input character is obtained on the assistant on-screen keyboard, and the key and the adjoining keys are simultaneously displayed on the screen 14.

Figure 4B:
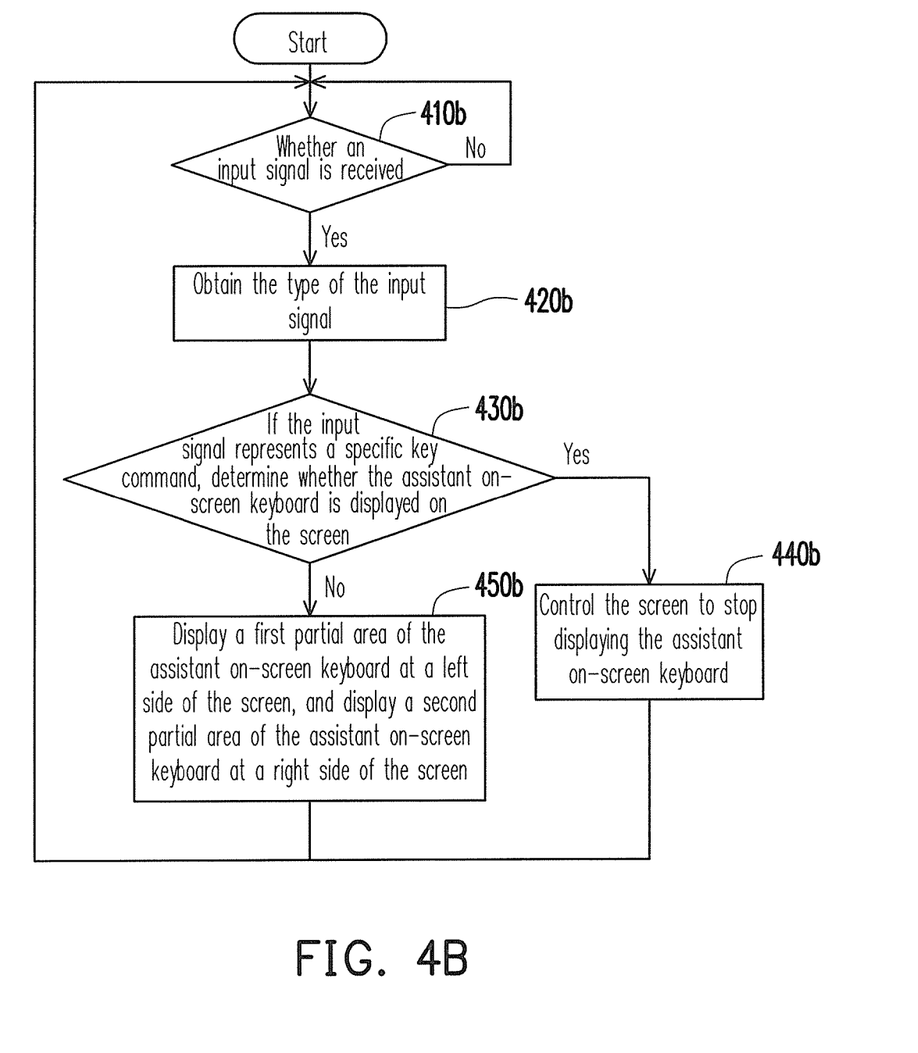
FIG. 4B is a flowchart of a keyboard input method according to still another embodiment of the present invention.

FIG. 4B is a flowchart of a keyboard input method according to still another embodiment of the present invention. Referring to FIG. 1 and FIG. 4B, in the present embodiment, it is assumed that the assistant on-screen keyboard program is already launched. When the keyboard display decision-making module 110 determines that an input signal issued by the input module 12 of the electronic device 10 is received (step 410*b*), the type of the input signal is then obtained (step 420*b*), and if the input signal represents a specific key command triggered by a specific key (for example, a hot key or a function key), whether the assistant on-screen keyboard is already displayed on the screen 14 is determined (step 430*b*). If the assistant on-screen keyboard is already displayed on the screen 14, the screen 14 is controlled to stop displaying the assistant on-screen keyboard (step 440*b*). However, if the assistant on-screen keyboard is not yet displayed on the screen 14, a first partial area of the assistant on-screen keyboard is displayed at the left side of the screen 14, and a second partial area of the assistant on-screen keyboard is displayed at the right side of the screen 14 (step 450*b*). In the present embodiment, the first partial area includes a plurality of predetermined keys located within the left keyboard of the assistant on-screen keyboard, and the second partial area includes a plurality of predetermined keys located within the right keyboard of the assistant on-screen keyboard, wherein the predetermined keys may be preset by the manufacturer of the electronic device 10 when the electronic device 10 is manufactured or may also be determined by the user.

As shown in FIG. 4B, if the user wants to see the assistant on-screen keyboard on the screen 14, the user can press down the specific key to allow the keyboard input assistant system 100 to display the two predetermined partial areas of the assistant on-screen keyboard at both sides of the screen 14. When the user presses down the specific key again, the assistant on-screen keyboard originally displayed on the screen 14 is turned off. However, in an embodiment, when the user performs general character input through the input module 12, the keyboard input assistant system 100 constantly displays the key corresponding to the input character and the adjoining keys on the screen 14.

It should be mentioned that in the embodiment described above, the processing module 130 may display a settings menu on the screen 14, so as to receive a setting command through the settings menu and change the settings (for example, the key arrangement of the assistant on-screen keyboard, the predetermined keys corresponding to the left keyboard of the assistant on-screen keyboard, the predetermined keys corresponding to the right keyboard of the assistant on-screen keyboard, and the specific key for triggering the specific key command, etc) of the assistant on-screen keyboard according to the setting command. In other words, a user may set the key arrangement of the assistant on-screen keyboard, the specific key for turning on/off the assistant on-screen keyboard, and the contents of the predetermined partial areas displayed at both sides of the screen 14 through the settings menu provided by the processing module 130.

It should be noted that in the embodiment described above, besides being used for turning on or off the assistant on-screen keyboard, the specific key may also be used for turning on or off an error-detecting function of the assistant on-screen keyboard or switching the assistant on-screen keyboard to a error-detecting mode or an assistant input mode. Namely, the user can turn on/off the assistant on-screen keyboard or switch it to different modes by pressing down the specific key.

As described above, the present invention provides a keyboard input method and an assistant system thereof, wherein when an input error produced by a user is detected, part of an assistant on-screen keyboard is automatically displayed on the screen, and the key causing the input error is especially marked so that the user can find the desired character around the key according to the position of the key. In addition, two partial areas of the assistant on-screen keyboard may be displayed respectively at both sides of the screen when the user presses a specific key, so that the user can instantly find a desired key. Thereby, the input efficiency is greatly improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A keyboard input method, suitable for an electronic device having a screen and an assistant on-screen keyboard, the keyboard input method comprising:
   launching an assistant on-screen keyboard program;
   receiving an input signal;
   if it is determined that the input signal represents an input character, obtaining a database corresponding to an input method, wherein the database comprises a plurality of words;

determining that the input character does not lead to an input error if the input character and at least one previous input character form one of the words;

determining that the input character leads to the input error if the input character and the at least one previous input character do not form one of the words;

if the input character leads to the input error, obtaining a position of a key corresponding to the input character on a keyboard and displaying a partial area of the assistant on-screen keyboard according to the position, wherein the partial area comprises the key leading to the input error and a plurality of adjoining keys surrounding the key, and the key and the adjoining keys within the partial area are arranged and displayed according to a keyboard layout of the assistant on-screen keyboard, wherein the assistant on-screen keyboard is divided into a left keyboard and a right keyboard;

determining whether the position is located within the left keyboard or the right keyboard;

serving a left side of the screen as a first side and a right side of the screen as a second side if the position is located within the left keyboard;

obtaining at least one predetermined key corresponding to the right keyboard as an assistant partial area;

controlling the screen to stop displaying the partial area of the assistant on-screen keyboard when a correct input signal is received, wherein an input character of the correct input signal and the at least one previous input character form one of the words; and if the input character does not lead to the input error, not displaying the assistant on-screen keyboard.

2. The keyboard input method according to claim 1, wherein after the step of determining whether the position is located within the left keyboard or the right keyboard, the keyboard input method further comprises:

serving the right side of the screen as the first side and the left side of the screen as the second side if the position is located within the right keyboard; and obtaining the at least one predetermined key corresponding to the left keyboard as the assistant partial area.

3. The keyboard input method according to claim 2, wherein the step of displaying the partial area of the assistant on-screen keyboard according to the position comprises:

displaying the partial area of the assistant on-screen keyboard at the first side of the screen; and displaying the assistant partial area of the assistant on-screen keyboard at the second side of the screen.

4. The keyboard input method according to claim 3, wherein the step of displaying the assistant partial area of the assistant on-screen keyboard at the second side of the screen comprises:

displaying the assistant partial area close to the second side.

5. The keyboard input method according to claim 3, wherein the step of displaying the partial area of the assistant on-screen keyboard at the first side of the screen comprises:

obtaining the adjoining keys around the key in the left keyboard or the right keyboard according to the position;

serving the key and the adjoining keys as the partial area; and displaying the partial area close to first side.

6. The keyboard input method according to claim 5, wherein the step of displaying the partial area close to the first side comprises:

marking the key corresponding to the input character with a specific mark.

7. The keyboard input method according to claim 3, wherein after the step of displaying the partial area at the first side and the assistant partial area at the second side according to the position, the keyboard input method further comprises:

controlling the screen to stop displaying the assistant partial area of the assistant on-screen keyboard when the correct input signal is received.

8. The keyboard input method according to claim 1, wherein the input signal is from a physical keyboard or a software input panel (SIP) of the electronic device.

9. A keyboard input method, suitable for an electronic device having a screen and an assistant on-screen keyboard, the keyboard input method comprising:

launching an assistant on-screen keyboard program;

receiving an input signal;

if it is determined that the input signal represents an input character, obtaining a database corresponding to an input method, wherein the database comprises a plurality of words;

determining that the input character does not lead to an input error if the input character and at least one previous input character form one of the words, and determining that the input character leads to the input error if the input character and the at least one previous input character do not form one of the words;

if the input character leads to the input error, obtaining a position of a key corresponding to the input character on a keyboard and determining whether the position is located within a left keyboard of the assistant on-screen keyboard or a right keyboard of the assistant on-screen keyboard;

serving a left side of the screen as a first side if the position is located within the left keyboard, and serving a right side of the screen as the first side if the position is located within the right keyboard;

displaying a partial area of the assistant on-screen keyboard at the first side of the screen, wherein the partial area comprises the key leading to the input error and a plurality of adjoining keys surrounding the key, and the key and the adjoining keys within the partial area are arranged and displayed according to a keyboard layout of the assistant on-screen keyboard;

controlling the screen to stop displaying the partial area of the assistant on-screen keyboard when a correct input signal is received, wherein an input character of the correct input signal and the at least one previous input character form one of the words; and if the input character does not lead to the input error, not displaying the assistant on-screen keyboard.

10. The keyboard input method according to claim 9, wherein the step of displaying the partial area of the assistant on-screen keyboard at the first side of the screen comprises:

serving the right side of the screen as a second side if the position is located within the left keyboard, and serving the left side of the screen as the second side if the position is located within the right keyboard; and displaying the partial area of the assistant on-screen keyboard at the first side of the screen and displaying an assistant partial area of the assistant on-screen keyboard at the second side of the screen.

11. The keyboard input method according to claim 10, wherein after the step of displaying the partial area of the assistant on-screen keyboard at the first side of the screen, the keyboard input method further comprises:

controlling the screen to stop displaying the partial area of the assistant on-screen keyboard and the assistant partial area of the assistant on-screen keyboard when a correct input signal is received, wherein an input character of the correct input signal and the at least one previous input character form one of the words.

12. The keyboard input method according to claim 10, wherein the assistant partial area of the assistant on-screen keyboard comprises at least one predetermined key, the at least one predetermined key corresponding to the right keyboard if the position is located within the left keyboard, and the at least one predetermined key corresponding to the left keyboard if the position is located within the right keyboard.

13. A hardware electronic device, comprising:
a central processing unit;
an input module;
a screen; and
a keyboard input assistant system, including:
a keyboard display decision-making module, for determining whether an input signal issued by an input module of an electronic device represents an input character when the input signal is received;
an input method error-detecting module, coupled to the keyboard display decision-making module, for determining whether the input character leads to an input error according to an input method of the electronic device if the keyboard display decision-making module determines that the input signal represents the input character; and
a processing module, coupled to the keyboard display decision-making module and the input method error-detecting module, for notifying the keyboard display decision-making module to obtain a position of a key corresponding to the input character on a keyboard when an assistant on-screen keyboard program is launched and the input character leads to the input error,
wherein the keyboard display decision-making module displays a partial area of the assistant on-screen keyboard on the screen of the electronic device according to the position, wherein the partial area comprises the key leading to the input error and a plurality of adjoining keys surrounding the key, and the key and the adjoining keys within the partial area are arranged and displayed according to a keyboard layout of the assistant on-screen keyboard,
wherein the input method error-detecting module obtains a database corresponding to the input method, wherein the database comprises a plurality of words,
wherein the input method error-detecting module determines that the input character does not lead to the input error if the input character and at least one previous input character form one of the words, and determines that the input character leads to the input error if the input character and the at least one previous input character do not form one of the words,
wherein the keyboard display decision-making module controls the screen to stop displaying the partial area of the assistant on-screen keyboard when a correct input signal is received, wherein an input character of the correct input signal and the at least one previous input character form one of the words.

* * * * *